United States Patent
Tsubouchi et al.

(10) Patent No.: US 6,397,724 B1
(45) Date of Patent: Jun. 4, 2002

(54) NEGATIVE PRESSURE TYPE SERVO UNIT

(75) Inventors: Kaoru Tsubouchi; Nobuyuki Hirota, both of Toyota; Akihiko Miwa, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/461,215

(22) Filed: Dec. 16, 1999

(30) Foreign Application Priority Data

Dec. 16, 1998 (JP) .......................................... 10-357087

(51) Int. Cl.⁷ ........................... B60T 13/52; B60T 13/74
(52) U.S. Cl. ..................................................... 91/376 R
(58) Field of Search ............................... 91/369.1, 367, 91/374, 376 R (56) References Cited

U.S. PATENT DOCUMENTS

| | | | |
|---|---|---|---|
| 5,483,866 A | 1/1996 | Schlüter | 91/367 |
| 5,704,270 A * | 1/1998 | Tsubouchi | 91/376 R |
| 5,845,556 A * | 12/1998 | Tsubouchi et al. | 91/367 |
| 5,857,399 A * | 1/1999 | Tsubouchi et al. | 91/369.1 |
| 5,904,088 A * | 5/1999 | Ogura et al. | 91/376 R |

FOREIGN PATENT DOCUMENTS

JP           9-2246           1/1997

* cited by examiner

*Primary Examiner*—John Ryznic
(74) *Attorney, Agent, or Firm*—Burns, Doane, Swecker & Mathis, LLP (57) ABSTRACT

A negative pressure type servo unit which allows the size of the actuator to be reduced includes a housing, a movable wall positioned in the housing, a power piston, an input member, a plunger, a valve mechanism, an output rod, an actuator and a seal member. The seal is designed to include a first engaging portion and a second engaging portion producing a pressure difference on a front side and a rear side of the seal.

20 Claims, 7 Drawing Sheets

NEGATIVE PRESSURE TYPE SERVO UNIT

This application is based on and claims priority under 35 U.S.C. §119 with respect to Japanese Application No. 10(1998)-357087 filed on Dec. 16, 1998, the entire content of which is incorporated herein by reference.

FIELD OF THE INVENTION

The present invention generally relates to a negative pressure type servo unit. More particularly, the present invention pertains to a negative pressure type servo unit applied to an automobile.

BACKGROUND OF THE INVENTION

Japanese Patent Laid-Open Publication No. 2246/1997 describes a negative pressure type servo unit that includes a housing forming at least one pressure space within its interior, a movable wall installed in the housing progressively and regressively movable relative to the housing and dividing the pressure space into a front chamber communicating with a negative pressure source and a rear chamber selectively communicated with the front chamber and the atmosphere, a power piston coupled to the movable wall, an input member arranged at an inner portion of the power piston and movable in a forward and rearward direction by operating a brake member, and a plunger arranged coaxially within the power piston and movable in the forward and rearward direction through movement of the input member. A seal member is arranged between the plunger and the input member, and a valve mechanism is provided for communicating the rear chamber with the atmosphere and cutting off the rear chamber from the atmosphere and for communicating the negative pressure source with the rear chamber and cutting off the negative pressure chamber from the rear chamber by moving the plunger. An output member outputs the progressive force of the power piston to outside the unit by being moved through movement of the power piston in accordance with movement of the movable wall. An actuator is also provided for moving the plunger. A pressure difference is produced between the front side and the rear side of the seal member at least when the front chamber is communicated with the rear chamber and the plunger is slidably moved on the seal member.

In the above-described negative pressure type servo unit, the pressure difference is produced between the front side and the rear side of the seal member at least when the front chamber is communicated with the rear chamber and accordingly, there is a concern that a sticking phenomenon may occur in which a sliding portion of the seal member where the plunger slidably moves sticks to the plunger by the pressure difference.

When such a sticking phenomenon occurs in the seal member, the drive force of the actuator must be increased and this may lead to the need for a relatively large actuator.

A need thus exists for a negative pressure type servo unit that is not as susceptible to the aforementioned sticking phenomenon and that permits the size of the actuator to be reduced.

SUMMARY OF THE INVENTION

In light of the foregoing, the present invention provides a negative pressure type servo unit that includes a housing in which is defined at least one pressure space, a movable wall installed in the housing for progressing and regressing relative to the housing and dividing the pressure space into a front chamber communicated with a negative pressure source and a rear chamber selectively communicated with the front chamber and atmosphere, a power piston coupled to the movable wall, an input member arranged at an inner portion of the power piston and movable in a forward and rearward direction by operating a brake, a plunger arranged to the input member coaxially inside the power piston and movable in the forward and rearward direction by moving the input member, a seal member arranged between the plunger and the input member, and a valve mechanism for communicating the rear chamber with the atmosphere and cutting off the rear chamber from the atmosphere and communicating the negative pressure source with the rear chamber and cutting off the negative pressure chamber from the rear chamber by moving the plunger. An output member outputs a progressive force of the power piston to outside the unit by being made to progress as a result of progress of the power piston in accordance with movement of the movable wall, and an actuator is adapted to move the plunger. The seal member includes a first engaging portion engaged with the input member so that the engaging portion is movable integrally with the input member and a second engaging portion engaged with the plunger so that the second engaging portion is movable integrally with the plunger.

According to another aspect of the invention, a negative pressure type servo unit includes a housing in which is formed at least one pressure space, a movable wall installed in the housing for progressing and regressing relative to the housing and dividing the pressure space into a front chamber communicated with a negative pressure source and a rear chamber selectively communicated with the front chamber and atmosphere, a power piston coupled to the movable wall, an input member arranged at an inner portion of the power piston and movable in a forward and rearward direction by operating a brake, and a plunger arranged at the input member inside the power piston and movable in the forward and rearward direction. A seal member is arranged between the plunger and the input member, and includes a portion engaging the plunger to move integrally with the plunger. A valve mechanism controls relative pressures in the front and rear chambers, and an output member outputs a progressive force of the power piston to outside the unit by being made to progress as a result of progress of the power piston in accordance with movement of the movable wall. The unit also includes an actuator adapted to move the plunger.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
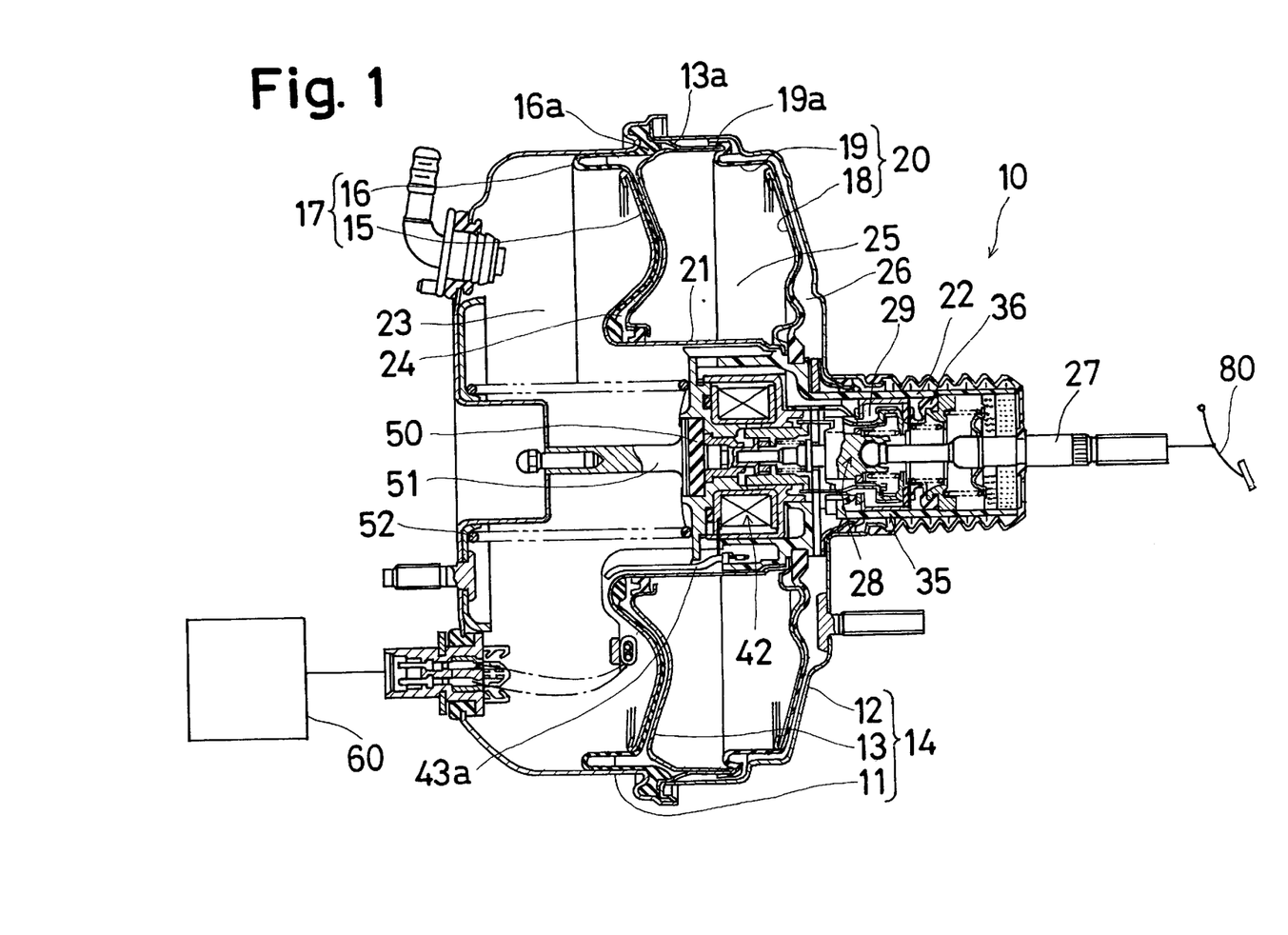
FIG. 1 is a cross-sectional view of a negative pressure type servo unit according to one embodiment of the present invention.
Figure 2:
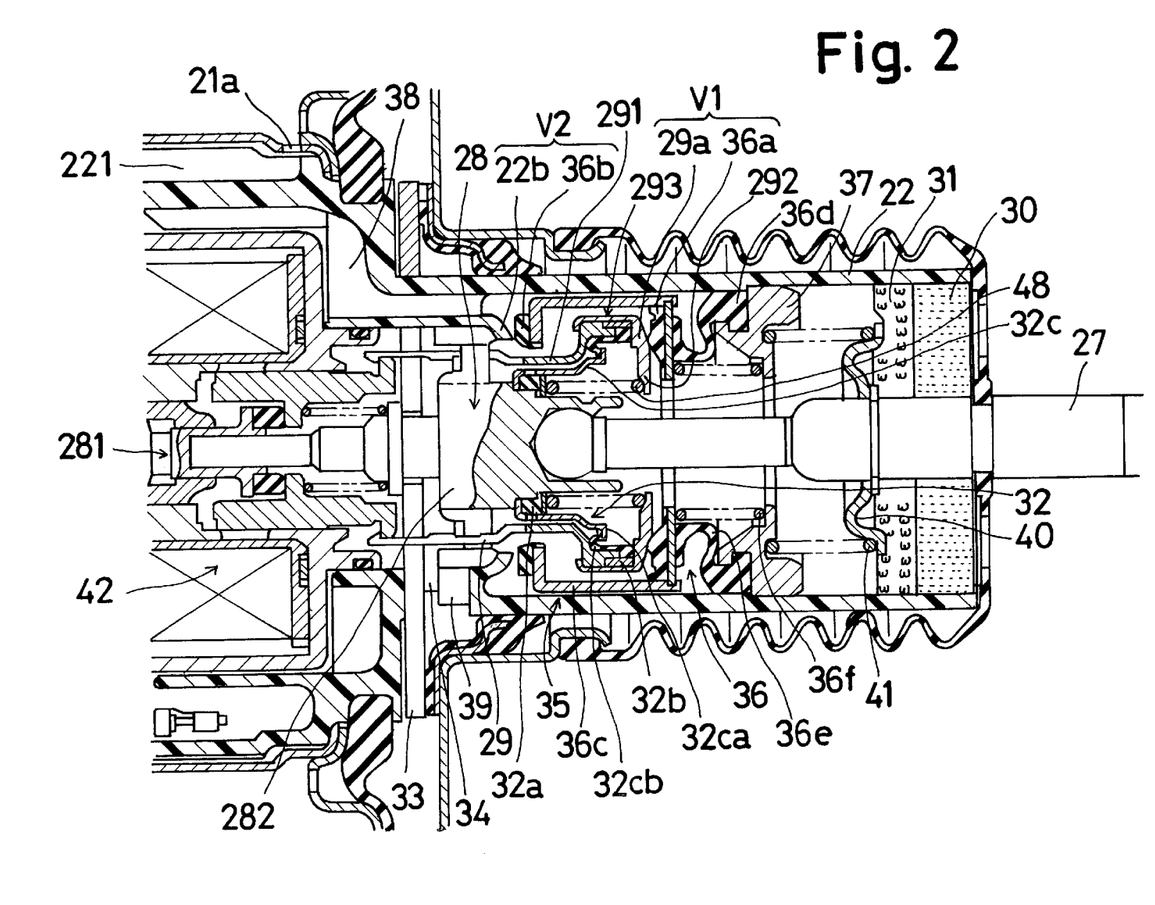
FIG. 2 is an enlarged cross-sectional view of the valve mechanism portion of the negative pressure type servo unit shown in FIG. 1.
Figure 3:
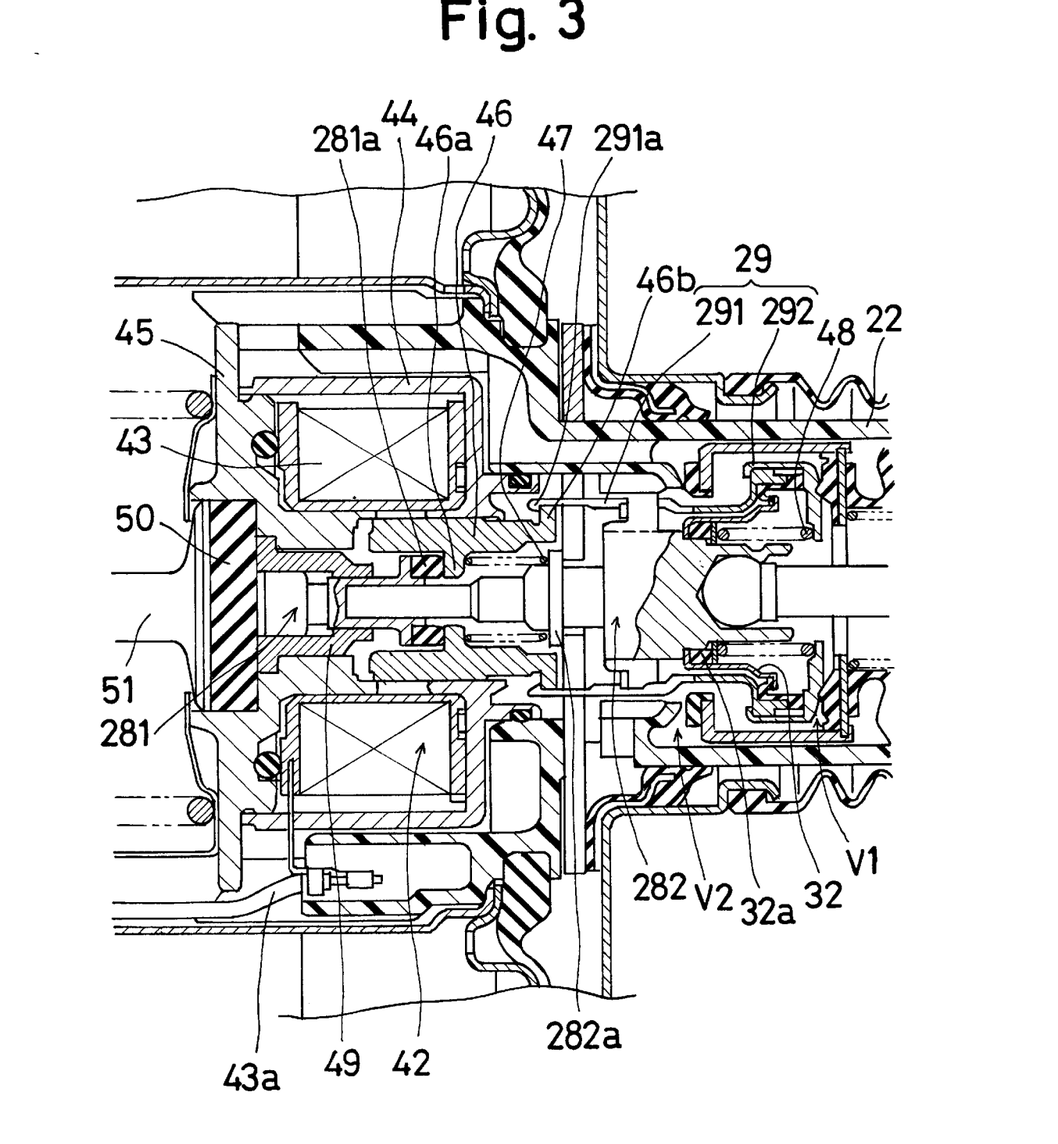
FIG. 3 is an enlarged cross-sectional view of the actuator portion of the negative pressure type servo unit shown in FIG. 1.

FIGS. 1–3 illustrate features and characteristics of the negative pressure type servo unit 10 according to a first embodiment of the invention. As shown in FIG. 1 and FIG. 2, the negative pressure type servo unit 10 includes a housing 14 constituted by a front shell 11 and a rear shell 12, and a partition wall member 13 positioned between the two shells and defining a front pressure chamber and a rear pressure chamber within the interior of the housing.

A front side movable wall 17 comprising a front side plate 15 made of metal and a front side diaphragm made of rubber are installed in the front side pressure chamber within the housing 14. The front side movable wall 17 is adapted to progressively and regressively move (i.e., to move in the forward direction and the rearward direction). A rear side movable wall 20 comprising a rear side plate 18 made of a metal and a rear side diaphragm 19 made of rubber is installed in the rear side pressure chamber for progressive and regressive movement.

The central portion of the front side plate 15 is integrally provided with a cylindrical portion 21 extending through a central portion of the partition wall member 13 in an airtight and slidable manner. A bead portion at the inner peripheral edge of the front side diaphragm 16 is fixed in an airtight manner to the outer peripheral face of the front end portion of the cylindrical portion 21 of the front side plate 15. A bead portion at the outer peripheral edge of the front side diaphragm 16 is sandwiched in an airtight manner by the outer peripheral portions of the shells 11, 12 along with the outer peripheral edge portion of the partition wall member 13.

A bead portion at the outer peripheral edge of the rear side diaphragm 19 is sandwiched in an airtight manner by a foldback portion provided on the inner diameter side of the outer peripheral edge of the partition wall member 13 and the rear shell 12. On the outer periphery of a front side portion of a power piston 22 that extends through a rear opening portion of the rear shell 12 in an airtight and slidable manner, the rear end of the cylindrical portion 21 of the front side plate 15 and the inner peripheral edge portion of the rear side plate 18 are fixed and a bead portion at the inner peripheral edge of the rear side diaphragm 19 is fixed in an airtight manner.

The front side pressure chamber inside the housing 14 is thus divided into a first front chamber 23 and a first rear chamber 24, and the rear side pressure chamber at the inside of the housing 14 is divided into a second front chamber 25 and a second rear chamber 26. The first front chamber 23 is communicated with an intake manifold (not illustrated) of an engine constituting a negative pressure source and is normally maintained at negative pressure. The second front chamber 25 is communicated with the first front chamber 23 by a hole 21a formed at the cylindrical portion 21 of the front side plate 15 and a groove 221 formed at the outer periphery of the front end portion of the power piston 22. The second front chamber 25 is thus also normally maintained at negative pressure.

The first rear chamber 24 is communicated with the second rear chamber 26 by a groove 16a formed at the inner peripheral face of the bead portion at the outer peripheral edge of the front side diaphragm 16, a hole 13a formed at the partition wall member 13, and a groove 19a formed at the outer peripheral face of the bead portion at the outer peripheral edge of the rear side diaphragm 19.

An input rod 27 is positioned at the inner portion of the power piston 22 such that the input rod 27 can progress and regress with respect to the power piston 22. The input rod 27 is connected by a ball joint at its front end to an input member 28 slidably guided by the power piston 22 in the forward and rearward directions (left and right directions in FIG. 1) and is connected to a brake pedal 80 at its rear end.

A filter 30 and a noise reduction member 31 are arranged at a rear opening portion inside of the power piston 22. The inner space of the power piston 22 communicates with the outer space of the negative pressure type servo unit 10 via the noise reduction member 31 and the filter 30.

The input member 28 is arranged inside the power piston 22 on a forward side (i.e., the left side in FIG. 2) of the power piston 22. The input member 28 is provided with a first input member 281 a front face of which is brought into contact with a rear face of the reaction disk 50, and a second input member 282 arranged on a rear side (i.e., the right side in FIG. 2) of the first input member 281 coaxially with the first input member 281 and connected to the input rod 27.

A plunger 29 is arranged on a peripheral face side of the input member 28 and is disposed coaxially with the input member 28. The plunger 29 is movably arranged in the forward and rearward directions relative to the input member 28 and is provided with an atmospheric valve seat 29a at its rear end portion.

The plunger 29 is provided with a front portion 291 and a rear portion 292. The front portion 291 is arranged on a front side thereof and defines substantially a stepped cylindrical shape. The rear portion 292 is arranged on the rear side of the front portion 291 and is installed with the atmospheric valve seat 29a on the rear face of an inwardly directed flange portion formed at its rear end portion. The front portion 291 and the rear portion 292 are made to be dividable in the forward and rearward directions at a dividing portion 293.

A seal member 32 is arranged between the outer peripheral portion of the input member 28 and the inner peripheral portion of the plunger 29. The seal member 32 seals in an airtight manner the intermediary portion between the outer peripheral portion of the input member 28 and the inner peripheral portion of the plunger 29.

The first input member 281 is provided with a recessed portion at its rear portion which opens rearwardly, and a front end portion of the second input member 282 is slidably inserted into the recessed portion of the first input member 281 in the forward and rearward direction. Accordingly, the first input member 281 is movable in the forward and rearward directions relative to the second input member 282. In the initial state shown in FIG. 2, a bottom face of the recessed portion 281d of the first input member 281 is brought into contact with the front end face of the second input member 282.

The power piston 22 is installed with a key member 33 for prescribing a progress or forward limit position and a regress or rearward limit position of the input member 28 relative to the power piston 22. The key member 33 is inserted into a radially directed hole 34 formed on the power piston 22 and is locked by the power piston 22 so that the key member 33 cannot become detached from the power piston 22.

At the inner portion of the power piston 22, a valve mechanism 35 is installed for switching between a power reducing operational state, a power maintaining operational state, and a power increasing operational state based on the position of the input member 28 in the forward and rearward direction relative to the power piston 22. In the power reducing operational stat, the second rear chamber 26 is communicated with the first front chamber 23 and is cut off from the atmosphere. In the power maintaining operational state, the second rear chamber 26 is cut off from the first front chamber 23 and the atmosphere. In the power increasing operational state, the second rear chamber 26 is cut off from the first front chamber 23 and is communicated with the atmosphere.

The valve mechanism 35 is constituted by a rearwardly directed atmospheric valve seat 29a possessing a substantially annular or ring-like shape and integrally formed with the plunger 29, a rearwardly directed negative pressure valve seat 22b possessing a substantially annular or ring-like shape and integrally formed with the power piston 22, and a control valve 36. The control valve 36 is integrally provided with an atmospheric sealing portion 36a possessing a substantially annular or ring-like shape opposing the atmospheric valve seat 29a and capable of being brought into contact with and detached from the atmospheric valve seat 29a, and a negative pressure sealing portion 36b possessing a substantially annular or ring-like shape opposing the negative pressure valve seat 22b and capable of being brought into contact with and detached from the negative pressure valve seat 22b.

The control valve 36 is constituted by a movable portion 36c integrally provided with the atmospheric sealing portion 36a and the negative pressure sealing portion 36b, a fixed portion 36d fixed in an airtight manner to the power piston 22 by a retainer 37, an elongating and contracting portion 36e for connecting the movable portion 36c and the fixed portion 36d and possessing a stepped cylinder shape capable of being elongated and contracted in the forward and rearward direction, and a valve spring 36f for urging the movable portion 36c in the forward direction.

The movable portion 36c is provided with a main body portion defining a substantially cylindrical shape, is provided with the negative pressure sealing portion 36b at a front radially inwardly directed flange portion arranged on the front side of the main body portion, and is provided with the atmospheric sealing portion 36a at a rear radially inwardly directed flange portion arranged on the rear side of the main body portion. That is, in the control valve 36, the atmospheric sealing portion 36a and the negative pressure sealing portion 36b are separated from each other in the forward and rearward direction, and the atmospheric sealing portion 36a is disposed rearward from the negative pressure sealing portion 36b.

In the valve mechanism 35, the atmospheric sealing portion 36a and the atmospheric valve seat 29a constitute an atmospheric valve V1, and the negative pressure sealing portion 36b and the negative pressure valve seat 22b constitute a negative pressure valve V2. As is apparent from FIG. 2, the atmospheric valve V1 and the negative pressure valve V2 are separated from each other in the forward and rearward direction, and the atmospheric valve V1 is disposed rearward from the negative pressure valve V2.

A large diameter portion on the rear side of the front portion 291 of the plunger 29, the rear portion 292 and the dividing portion 293 are arranged within the movable portion 36c of the control valve 36, that is between the atmospheric sealing portion 36a and the negative pressure sealing portion 36b.

The sealing member 32 is provided with a first engaging portion 32a engaged with the input member 28 and movable integrally with the input member 28, a second engaging portion 32b engaged with the plunger 29 and movable integrally with the plunger 29, and an intermediary portion 32c arranged between the first engaging portion 32a and the second engaging portion 32b and connecting the first engaging portion 32a and the second engaging portion 32b.

The first engaging portion 32a and the second engaging portion 32b are separated from each other in the forward and rearward direction, and the second engaging portion 32b is arranged on the rear side of the first engaging portion 32a.

The first engaging portion 32a possesses an annular or ring-like shape, is formed by a rubber member and is fitted to the outer peripheral portion of the second input member 282. The second engaging portion 32b comprises a metal member, possesses an annular or ring-like shape and is sandwiched by the front portion 291 and the rear portion 292 at the dividing portion 293 of the plunger 29.

The intermediary portion 32c is provided with a stepped cylindrical member 32ca engaged with the first engaging portion 32a at its front end portion and constituting a first extending portion extended rearward from the first engaging portion 32a in the forward and rearward direction, and a rolling film 32cb constituting a second extending portion extended from the rear end portion of the cylindrical member 32ca toward the second engaging portion 32b and comprising a bent portion.

The rolling film 32cb comprises a rubber member, is provided with an inner peripheral cylindrical portion, an outer peripheral cylindrical portion and a connecting portion connecting the rear end portion of the inner peripheral cylindrical portion and the front end portion of the outer peripheral cylindrical portion. The rolling film 32cb possesses a bent shape which is opened rearwardly. The rear end portion of the inner peripheral cylindrical portion of the rolling film 32cb is fixed to an outwardly-directed flange portion formed at a rear end portion of the stepped cylindrical member 32ca by baking, and the rear end portion of the outer peripheral cylindrical portion is fixed to the inner peripheral portion of the second engaging portion 32b by baking and is fixedly sandwiched by the front portion 291 and the rear portion 292 at the dividing portion 293 of the plunger 29.

The front portion 291 and the rear portion 292 of the plunger 29 are integrated by caulking the front end portion of the rear portion 292 at the front face of a stepped difference portion of the front portion 291.

The power piston 22 is formed with a vacuum path 38 for communicating the negative pressure valve V2 of the valve mechanism 35 and the first front chamber 23, and an air path 39 for connecting the atmospheric valve V1 of the valve mechanism 35 and the second rear chamber 26. An inner peripheral side space portion of the fixed portion 36d of the control valve 36 at the inside of the power piston 22 is communicated with the atmosphere via the noise reduction member 31, the filter 30 and a rear opening portion of the power piston 22.

In this valve mechanism 35, the second rear chamber 26 is cut off from the atmosphere by bringing the atmospheric valve seat 29a of the atmospheric valve V1 into contact with the atmospheric sealing portion 36a. The second rear chamber 26 is communicated with the atmosphere by separating the atmospheric valve seat 29a from the atmospheric sealing portion 36a. Communication between the first front chamber 23 and the second rear chamber 26 is cut off by bringing the negative pressure valve seat 22b of the negative pressure valve V2 into contact with the negative pressure sealing portion 36b and the first front chamber 23 is communicated with the second rear chamber 26 by separating the negative pressure valve seat 22b from the negative pressure sealing portion 36b.

The valve diameter of the atmospheric valve V1, that is the diameter of a portion where the atmospheric valve seat 29a is brought into contact with the atmospheric sealing portion 36a, and the valve diameter of the negative pressure valve V2, that is the diameter of a portion where the negative pressure valve seat 22b is brought into contact with the negative pressure sealing portion 36b, a seal diameter of the sealing member 32 or a diameter of the connecting portion of the rolling film 32cb which is a seal effective diameter of the seal member 32, and an effective diameter of the elongating and contracting portion 36e of the control valve 36, that is the diameter of the stepped difference portion of the elongating and contracting portion 36e, are respectively approximated.

A spring 41 is installed between a retainer 40 locked by the input rod 27 and the retainer 37. The spring 41 urges the input rod 27 and accordingly the input member 28 in the rearward direction and when the brake pedal 80 is not depressed, that is at the initial state shown by FIG. 2, the spring 41 brings the atmospheric valve 29a into contact with the atmospheric sealing portion 36a and maintains the negative pressure sealing portion 36b in a state in which the negative pressure sealing portion 36b is separated from the negative pressure valve seat 22b. At the initial state, a predetermined clearance exists between the negative pressure valve seat 22b and the negative pressure sealing portion 36b.

As shown by FIG. 3, the actuator 42 is installed at an inner portion of a front portion of the power piston 22. The actuator 42 is constituted by a solenoid coil 43, a yoke 44 comprising a magnetic member, a fixed core 45 comprising a magnetic member and a movable core 46 comprising a magnetic member. The movable core 46 is arranged on a front side (i.e., left side in FIG. 3) of the plunger 29, rearward from the first input member 281 and on the outer peripheral side of the front portion of the second input member 282, movably in the forward and rearward direction (i.e., the left and right direction in FIG. 3) relative to the power piston 22 and the input member 28. The movable core 46 defines a substantially cylindrical shape and is provided with a radially inwardly directed flange portion 46a at its middle portion and a radially outwardly directed flange portion 46b at its rear end portion.

The first input member 281 is provided with a contact portion 281a in contact with the inwardly directed flange portion 46a of the movable core 46 at its rear portion. The contact portion 281a is provided with an outwardly directed flange portion projecting from a rear opening portion of the recessed portion in an outer direction of the diameter direction and a rubber member possessing an annular or ring-like shape integrally arranged at the rear face of the outwardly directed flange portion.

The plunger 29 is engaged with the outwardly directed flange portion 46b of the movable core 46 at the front end portion 291a of the front portion 291.

The second input member 282 is provided with a front side radially outwardly directed flange portion 282a at the outer peripheral portion in its middle portion. A spring 47 is arranged between the rear face of the inwardly directed flange portion 46a of the movable core 46 and the front face of the front side radially outwardly directed flange portion 282a of the second input member 282. The spring 47 urges the movable core 46 in the forward direction.

A spring 48 is arranged between the rear end face of the first engaging portion 32a of the sealing member 32 and an inwardly directed flange portion formed at the rear end portion of the rear portion 292 of the plunger 29. The spring 48 urges the plunger 29 in the rearward direction and the urging force of the spring 48 is selected to be substantially equivalent to or lower than the urging force of the spring 47.

Accordingly, the movable core 46 is made to progress and regress integrally with the input member 28 relative to the power piston 22. A guide member 49 slidably supports the first input member 281 in the forward and rearward direction. The solenoid coil 43 is arranged on the outer peripheral side of the movable core 46 and the solenoid coil 43, the yoke 44 and the fixed core 45 are fixed to the power piston 22. The solenoid coil 43 is electrically connected to an electronic control apparatus 60 outside of the housing 14 by a lead wire 43a.

When electricity is not conducted to the solenoid coil 43 (i.e., when the actuator 42 is not operated), a predetermined amount of clearance exists between the front end face of the movable core 46 and the fixed core 45.

When electricity is conducted to the solenoid coil 43 (i.e., when the actuator 42 is operated), an electromagnetic attraction force is generated between the fixed core 45 and the movable core 46, and the movable core 46 is moved by the electromagnetic attraction force in the forward direction. A maximum progressing or moving amount of the movable core 46 corresponds to the clearance between the fixed core 45 and the movable core 46 in FIG. 3.

A rubber reaction disk 50 having a generally circular disk shape is installed in a large diameter portion of a stepped hole formed at the front end face of the fixed core 45. An output rod 51 extends through the central portion of the front shell 11 of the housing 14 in an airtight and slidable manner, and the rear end of the output rod 51 is slidably installed on the front side of the reaction disk 50 in the large diameter portion of the stepped hole.

As is well known, the reaction disk 50 transmits to the output rod 51 the progressive or forward force of the power piston 22 as well as the progressive or forward force of the input member 28, and exerts a reaction force having a magnitude corresponding to an output from the output rod 51 to the input member 28 to regress. At the initial state, there is provided a predetermined clearance between the rear face of the reaction disk 50 and the front end face of the input member 28, that is the front end face of the first input member 281.

As shown in FIG. 1, a return spring 52 is installed at the central portion of the first front chamber 23 for making the power piston 22, and the two movable walls 17, 20 coupled to the power piston 22, regress or move rearwardly relative to the housing 14.

The output rod 51 is operationally connected to a piston (not illustrated) of a master cylinder. The master cylinder is provided with a reservoir tank and the master cylinder is connected with actuator units of ABS (antilock brake system), TRC (traction control) and braking and steering control via hydraulic pressure pipe lines. The actuator units are respectively connected with wheel cylinders arranged at respective wheels via hydraulic pressure pipe lines.

Before integrating the spring 48 and the seal member 32 to the input member 28, after fixedly holding the second engaging portion 32b of the seal member 32 to the plunger 29, when the spring 48 is arranged between the first engaging portion 32a and the inwardly directed flange portion of the rear portion 292 of the plunger 29, by the urging force of the spring 48, the first fixed portion 32a and the intermediary portion 32c of the seal member 32 are urged in the forward direction and the front face of the stepped difference portion of the cylindrical member 32ca of the intermediary portion 32c of the seal member 32 is brought into contact with the rear face of the stepped difference portion of the front portion 291 of the plunger 29. The plunger 29, the seal member 32 and the spring 48 are thus integrated.

The operation of the negative pressure type servo unit is as follows. The state shown in FIGS. 1–3 is the state in which the brake pedal 80 is not depressed and the actuator 42 is not operated, and there is adopted the power reducing operational state in which the valve mechanism 35 communicates the second rear chamber 26 with the first front chamber 23 and cuts off the second rear chamber 26 from the atmosphere. That is, a state exists in which the atmospheric valve seat 29a is brought into contact with the atmospheric sealing portion 36a and the negative pressure valve seat 22b is separated from the negative pressure sealing portion 36b, with the pressure in the first rear chamber 24 and the second rear chamber 26 being lowered to the same pressure as that in the first front chamber 23.

Accordingly, no progressive or forward force is applied to the two movable walls 17, 20 and the power piston 22. The power piston 22 and the two movable walls 17, 20 coupled to the power piston 22 are held at regress or rearward limit positions relative to the housing 14.

Figure 4:
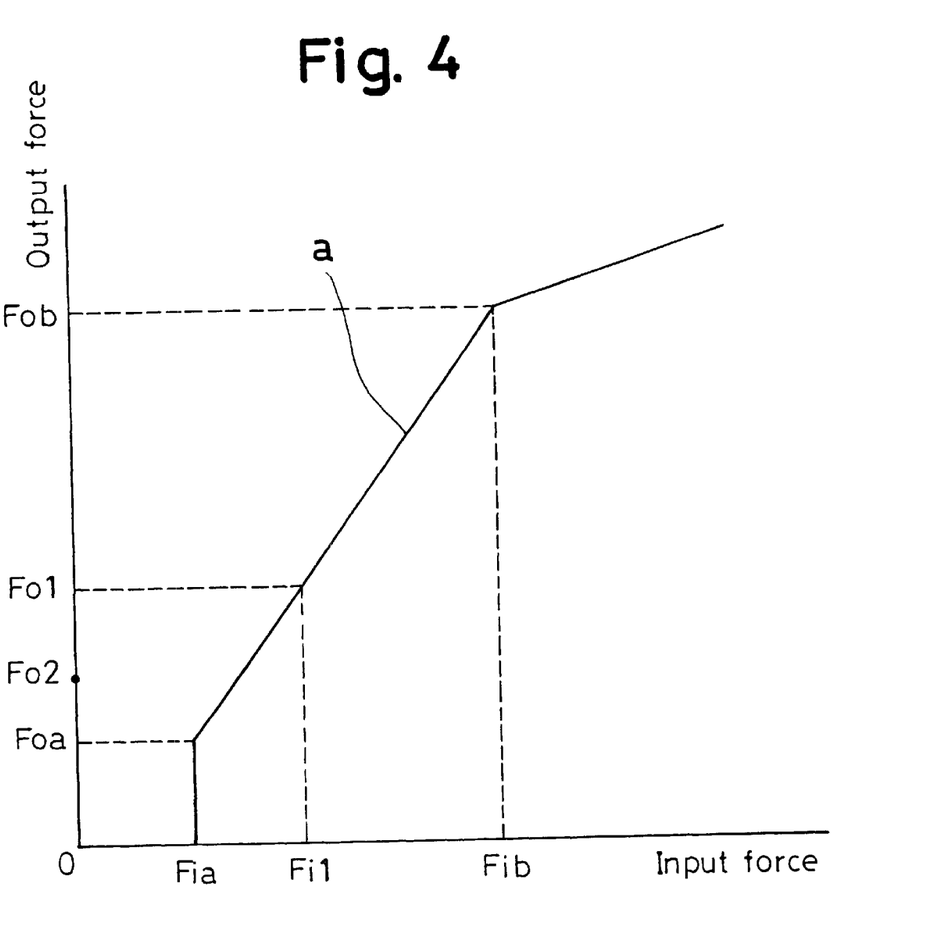
FIG. 4 is an input/output characteristic diagram of the negative pressure type servo unit shown in FIG. 1.

FIG. 4 is a characteristic line diagram of the negative pressure type servo unit 10 according to the present invention, wherein the ordinate designates the output and the abscissa designates the input. As shown in FIGS. 1–4, when a driver depresses the brake pedal 80 with an input of Fi1 for normal braking operation, the input rod 27 progresses relative to the piston 22.

By virtue of the forward movement or progress of the input rod 27, the second input member 282 of the input member 28 progresses integrally with the input rod 27. By the progress of the second input member 282, the bottom face of the recessed portion of the first input member 281 is pressed by the front end portion of the second input member 282 and therefore, in accordance with the progress of the second input member 282, the first input member 281 is also made to progress integrally with the second input member 282 and the input rod 27.

Further, based on the movement or progress of the second input member 282, the movable core 46 is urged in the forward direction by the second input member 282 via the spring 47 and so the movable core 46 and therefore, the plunger 29 engaged with the movable core 46, are moved in the forward direction. That is, the input member 28, the movable core 46, the plunger 29 and the input rod 27 progress integrally relative to the power piston 22.

In addition, in accordance with the progress or movement of the input member 28 and the plunger 29, the first and the second engaging portions 32a, 32b of the seal member 32 engaged with the input member 28 and the plunger 29 are respectively made to progress and accordingly, the seal member 32 including the intermediary portion 32c is made to progress integrally with the input member 28 and the plunger 29.

In accordance with the movement of the input member 28 and the plunger 29, the movable portion 36c of the control valve 36 is urged in the forward direction by the valve spring 36f and progresses integrally with the input member 28, and the negative pressure sealing portion 36b of the control valve 36 is brought into contact with the negative pressure valve seat 22b of the power piston 22 and the negative pressure valve V2 is closed.

By closing the negative pressure valve V2, communication between the vacuum path 38 and the air path 39 is cut off and the second rear chamber 26 is cut off from the first front chamber 23. That is, the valve mechanism 35 is switched from the power reducing operational state to the power maintaining operational state.

When the input rod 27, the input member 28, the plunger 29 and the movable core 46 further progress from the state in which the valve mechanism 35 is brought into the output maintaining operational state, the atmospheric valve seat 29a of the input member 28 is separated from the atmospheric sealing portion 36a of the control valve 36 and the atmospheric valve V1 is opened.

By opening the atmospheric valve V1, the air path 39 communicates with the atmosphere via the clearance between the atmospheric valve seat 29a and the atmospheric sealing portion 36a, the inner peripheral side space portion of the fixed portion 36d of the control valve 36 at the inside of the power piston 22, the noise reduction member 31, the filter 30 and the rear opening portion of the power piston 22. The second rear chamber 26 is thus communicated with the atmosphere and the valve mechanism 35 is switched to the power increasing operational state.

By switching the valve mechanism 35 to the power increasing operational state, atmospheric air flows into the second rear chamber 26 and further flows into the first rear chamber 24 from the second rear chamber 26. The pressure in the two rear chambers 24, 26 is thus increased and a progressive force is generated at the first movable wall 17 by the pressure difference between the pressure in the first front chamber 23 and the pressure in the first rear chamber 24. The progressive force is generated at the second movable wall 20 by the pressure difference between pressure in the second front chamber 25 and the pressure in the second rear chamber 26, and a progressive force is generated in the power piston 22 by the pressure difference between the pressure in the first front chamber 23 and pressure in the second rear chamber 26.

These components of the progressive force are transmitted from the power piston 22 to the output rod 51 via the fixed core 45 of the actuator 42 and the reaction disk 50, the two movable walls 17, 20, the power piston 22 and the output rod 51 start progressing integrally relative to the housing 14 and operation of the master cylinder is started.

At this time, the power piston 22 also progresses relative to the input member 28 and the plunger 29, and the atmospheric sealing portion 36a of the control valve 36 approaches the atmospheric valve seat 29a. Further, the reaction disk 50 is compressively deformed by the power piston 22 and the output rod 51, and rearwardly bulges into the small diameter portion of the stepped hole of the fixed core 45 or the central hole of the guide member 49.

By rearwardly bulging the reaction disk 50, the reaction disk 50 is finally brought into contact with the first input member 281. The reaction disk 50 transmits the progressive force of the power piston 22 and the progressive force of the input member 28 to the output rod 51 and urges or presses the first input member 281, and accordingly the second input member 282 and the plunger 29, by exerting the reaction force corresponding to the output from the output rod 51.

By making the power piston 22 progress relative to the input member 28 and the plunger 29, and by integrally rearwardly moving the first input member 281, the second input member 282 and the plunger 29 by exerting the reaction force to the input member 28 by the reaction disk 50 in accordance with the progress of the power piston 22, the atmospheric sealing portion 36a of the control valve 36 approaches the atmospheric valve seat 29a. Finally, the atmospheric valve seat 29a is again brought into contact with the atmospheric sealing portion 36a of the control valve 36 and the atmospheric valve V1 is closed. That is, atmospheric air stops flowing into the two rear chambers 24, 26 (the valve mechanism 35 is switched to the output maintaining operational state) and the progressive force of the two movable walls 17, 20 and the power piston 22 stops increasing.

At this time, the input applied from the brake pedal 80 to the input member 28 by the driver is at the value Fi1 indicated in FIG. 4, and an output provided from the output rod 51 to the master cylinder becomes a value Fo1 indicated in FIG. 4.

In the state in which the valve mechanism 35 is brought into the output maintaining operational state, when, for example, the input applied from the brake pedal 80 to the input member 28 is reduced to a value larger than Fia of FIG. 4, the input member 28 regresses relative to the power piston 22. In accordance with the regress of the input member 28, the movable portion 36c of the control valve 36 regresses relative to the power piston 22, the negative pressure sealing portion 36b is separated from the negative pressure valve seat 22b and the negative pressure valve seat V2 is opened (i.e., the valve mechanism 35 is switched to the power reducing operational state).

By separating the negative pressure valve seat 22b from the negative pressure sealing portion 36b, the vacuum path 38 is communicated with the air path 39 via the clearance between the negative pressure valve seat 22b and the negative pressure sealing portion 36b, the two rear chambers 24, 26 are communicated with the first front chamber 23, the atmospheric air in the two rear chambers 24, 26 is exhausted by the negative pressure source via the front chamber 23, and the pressure in the two rear chambers 24, 26 is reduced.

Accordingly, the progressive force of the two movable walls 17, 20 and the power piston 22 is reduced, and the movable walls 17, 20, the power piston 22 and the output rod 51 are made to regress relative to the housing 14. At this time, the power piston 22 also regresses relative to the input member 28, the negative pressure valve seat 22b approaches the negative pressure sealing portion 36b of the control valve 36 and finally the negative pressure valve seat 22b is brought into contact with the negative pressure sealing portion 36b, and the negative pressure valve V2 is closed. Accordingly, atmospheric air stops flowing from the two rear chambers 24, 26 into the first front chamber 23 (i.e., the valve mechanism 35 is switched to the output maintaining operational state) and the progressive force of the two movable walls 17, 20 and the power piston 22 stops being reduced.

At this time, the output generated by the negative pressure type servo unit 10 becomes an output on the operating line a in FIG. 4. That is, in normal operation, in a range of input of Fia–Fib, the input/output characteristics of the negative pressure type servo unit 10 follow the operating line a.

The value Fib of the input indicated in FIG. 4 shows an input value at which pressure in the two rear chambers 24, 26 reaches atmospheric pressure in normal operation under normal temperature. In the range of the input from the value Fia to the value Fib, the amount of change of the output applied from the output rod 51 to the master cylinder is larger than the amount of change of the input applied on the input member 28. A ratio of the output to the input, that is the inclination of the operating line a coincides with a ratio of the area of the rear face of the reaction disk 50 to the contact area between the rear face of the reaction disk 50 and the front end face of the input member 28.

In FIG. 4, the output in the case of an input of Fib is Fob. When the input is increased further from the value Fib, the output is increased by an amount equal to the increase of the input. Further, in FIG. 4, the amount of change of force per unit length of the ordinate is larger than the amount of change of force per unit length of the abscissa. When the graph is drawn by making the change amount of the force per unit length of the ordinate and the change amount of the force per unit length of the abscissa coincide with, each other, a line indicating a correlation of input-output in the case in which the input is larger than the value Fib possesses a slope of 45 degrees.

When, for example, an intervehicular distance sensor detects that an intervehicular distance between a driving vehicle and a forwardly located vehicle has become shorter than a predetermined distance, an automatic braking operation is carried out in which the electronic control apparatus 60 operates the actuator 42. That is, there is no operation of the brake pedal 80, the input rod 27 and the input member 28 by the driver. In other words, the actuator 42 is operated in a state having no input.

When the electronic control apparatus 60 effects a control to conduct electricity to the solenoid coil 43, an electromagnetic attraction force is generated between the movable core 46 and the fixed core 45, and the movable core 46 and the plunger 29 progress relative to the power piston 22 and the second input member 282 against the urging force of the spring 48. In accordance with the progress of the movable core 46 and the plunger 29, the first input member 281 engaged with the inwardly directed flange portion 46a of the movable core 46 via the contact portion 281a also progresses relative to the power piston 22 and the second input member 282.

At this time, by winding the outer peripheral cylindrical portion of the rolling film 32cb to the inner peripheral cylindrical portion via the contact portion in the seal member 32, the plunger 29 can progress smoothly relative to the second input member 282.

By virtue of the progress of the movable core 46, the plunger 29 and the first input member 281, the front end portion of the first input member 281 is brought into contact with the rear face of the reaction disk 50. That is, there is no clearance between the reaction disk 50 and the input member 28.

After bringing the reaction disk 50 into contact with the first input member 281, the movable core 46 and the plunger 29 are further progressed by elastically deforming the rubber member of the contact portion 281a of the first input member 281.

By making the plunger 29 progress, the movable portion 36c of the control valve 36 progresses by being urged in the forward direction by the spring 36f. By virtue of the progress of the movable portion 36c, the negative pressure sealing portion 36b is brought into contact with the negative pressure valve seat 22b, the negative pressure valve V2 is closed, the communication between the vacuum path 38 and the air path 39 is cut off to thereby cut off the communication between the first front chamber 23 and the second rear chamber 26, and the valve mechanism 35 is brought into the output maintaining operational state. Further, the atmospheric valve seat 29a of the plunger 29 is separated from the atmospheric sealing portion 36a of the control valve 36, the atmospheric valve V1 is opened and the valve mechanism 35 is brought into the output increasing operational state.

By bringing the valve mechanism 35 into the output increasing operational state, atmospheric air flows into the two rear chambers 24, 26 via the clearance between the atmospheric valve seat 29a and the atmospheric sealing portion 36a and the air path 39, the pressure in the two rear chambers 24, 26 is increased and the progressive force is generated in the two movable walls 17, 20 and the power piston 22.

The progressive force of the two movable walls 17, 20 and the power piston 22 is transmitted from the power piston 22 to the output rod 51 via the fixed core 45 of the actuator 42 and the reaction disk 50, the two movable walls 17, 20, the power piston 22, the actuator 42, the first input member 281, the plunger 29 and the output rod 51 integrally start progressing relative to the housing 14 and the master cylinder starts operating.

With the progressing movement of the power piston 22 relative to the housing 14, the reaction disk 50 is deformed and compressed by the power piston 22 and the output rod 51 to thereby bulge rearwardly and a portion of the reaction disk 50 advances into the small diameter portion of the stepped hole of the fixed core 45 (i.e., the central hole of the guide member 49), the reaction disk 50 transmits the progressive force of the power piston 22 and the progressive force of the input member 28 to the output rod 51 and exerts the reaction force in correspondence with the output from the output rod 51 to the first input member 281 and the movable core 46 and the plunger 29 engaged with the first input member 281 to thereby make the first input member 281, the movable core 46 and the plunger 49 regress relative to the power piston 22 and the second input member 282.

When the first input member 281, the movable core 46 and the plunger 29 receive the reaction force from the reaction disk 50 to thereby regress against the attraction force between the fixed core 45 and the movable core 46 generated by conducting electricity to the solenoid coil 42, that is the drive force of the actuator 42, the atmospheric sealing portion 36a of the control valve 36 is finally brought into contact with the atmospheric valve seat 29a, the communication between the air path 39 and the atmosphere is cut off, and atmospheric air stops flowing into the two rear chambers 24, 26 (i.e., the valve mechanism 35 is switched to the output maintaining operational state).

That is, an output Fo2 is outputted to the master cylinder shown in FIG. 4. In other words, the output Fo2 is outputted in a state having no input from the driver.

The piston of the master cylinder is pressed by receiving the output Fo2 of the negative pressure type servo unit 10 and brake fluid is delivered to the wheel cylinders of the respective wheels via the actuator unit by the negative pressure type servo unit 10. Accordingly, braking force based on the output Fo2 of the negative pressure type servo unit 10 is exerted to the respective wheels.

When a condition is established in which electricity is not conducted to the solenoid 43, for example, when the intervehicular distance sensor detects that the distance between the driving vehicle and the foregoing vehicle recovers to the predetermined value, the electronic control apparatus 60 stops conducting electricity to the solenoid 43 based on a detection result of the intervehicular distance sensor.

There is thus no drive force of the actuator 42 which has been operated on the movable core 46, the first input member 281 and the plunger 29, and the movable core 46, the first input member 281 and the plunger 29 return to their initial positions by being urged by the spring 47.

By virtue of the regressing movement of the plunger 29, the movable portion 36c of the control valve 36 regresses relative to the power piston 22, the negative pressure sealing portion 36b is separated from the negative pressure valve seat 22b, and the negative pressure valve V2 is opened (i.e., the valve mechanism 35 is switched to the output reducing operational state).

By separating the negative pressure valve seat 22b from the negative pressure sealing portion 36b, the vacuum path 38 is communicated with the air path 39 via the clearance between the negative pressure valve seat 22b and the negative pressure sealing portion 36b, the two rear chambers 24, 26 are communicated with the first front chamber 23, the atmosphere in the two rear chambers 24, 26 is exhausted via the first front chamber 23 by the negative pressure source, and the pressure in the two rear chambers 24, 26 is reduced.

Accordingly, the pressure difference between the sure in the front chambers 23, 25 and the sure in the two rear chambers 24, 26 is reduced. The two movable walls 17, 20 and the power piston 22 are urged in the rearward direction by the return spring 52 to return to their initial positions and in accordance with return of the power piston 22 to the initial position, the input member 28 and the input rod 27 also return to their initial positions. That is, the automatic operation of the negative pressure type servo unit 10 is finished.

In the initial state of the negative pressure type servo unit 10, that is in the output reducing operational state of the valve mechanism 35 in which the atmospheric valve seat 29a is brought into contact with the atmospheric sealing portion 36a and the negative pressure valve seat 22b is separated from the negative pressure sealing portion 36b, the second rear chamber 26 is communicated with the first front chamber 23 and accordingly, is brought under negative pressure and the space portion on the front side of the seal member 32, that is the inner space of the small diameter portion of the front portion 291 of the plunger 29, is communicated with the second rear chamber 26 via the air path 39, and accordingly is brought under negative pressure similarly.

The space portion on the rear side of the seal member 32, that is the inner space of the rear portion 292 of the plunger 29, is communicated with the atmosphere via the inner space of the elongating and contracting portion 36e of the control valve 36, the inner space of the power piston 22, and the rear opening portion of the power piston 22. Accordingly, negative pressure operates on the front side of the seal member 32, the atmospheric pressure operates on the rear side and accordingly the pressure difference is produced between the front side and the rear side of the seal member 32.

However, the seal member 32 is provided not with the slidable seal as in other known constructions, but with the second engaging portion 32b integrally movable with the plunger 29. Accordingly, in moving the plunger 29 in accordance with the operation of the actuator 42, the seal member 32 does not restrain the plunger 29 from moving by causing the sticking phenomenon, thereby enabling smooth operation of the plunger 29. Thus, a reduction in the driving force of the actuator 42 and a downsizing of the actuator 42 accompanied thereby is possible.

Assuming the actuator 42 is brought into a nonoperational state from an operational state and the plunger 29 returns in the rearward direction, that is to the initial position by the spring force of the spring 48. Then, the spring force of the spring 48 returns the plunger 29 and the control valve 36 against the forces produced by the atmospheric pressure operating on the plunger 29 and the control valve 36.

The magnitudes of the forces produced by the atmospheric pressure operating on the plunger 29 and the control valve 36 are determined respectively by a value produced by subtracting the seal diameter of the seal member 32 from the valve diameter of the atmospheric valve V1 formed by engaging the control valve 36 and the plunger 29 and a value produced by subtracting the valve diameter of the atmospheric valve V1 from an effective diameter of the control valve 36.

According to this embodiment of the present invention, the seal diameter of the seal member 32, the valve diameter of the atmospheric valve V1, and the effective diameter of the control valve 36 are made substantially equal to each other and accordingly, the spring force of the spring 48 can be reduced to a lowest limit. Assuming a case in which the actuator 42 is brought into the operational state from the nonoperational state and the plunger 29 is driven against the spring force of the spring 48, the electromagnetic force of the solenoid 43 can also be reduced and as a result the actuator 42 can be downsized.

Further, the seal diameter of the seal member 32, the valve diameter of the atmospheric valve V1, the valve diameter of the negative pressure valve V2 and the effective diameter of the control valve 36 are made substantially equal to each other and so the urging force of the spring 36f and the urging force of the spring 41 can be reduced to thereby enable a reduction of the pressing force applied on the input rod 27 or the brake pedal 80, that is a reduction in starting load.

As has been explained, according to the negative pressure type servo unit 10 of the present invention, the plunger 29 can be operated smoothly by arranging the seal member 32 as described above. Thus, the drive force of the actuator 42 can be reduced and the actuator 42 can be advantageously downsized accordingly.

Also, the seal member 32 is provided with the intermediary portion 32c which is elastically deformable and so the first engaging portion 32a and the second engaging portion 32b can be relatively moved smoothly. The plunger 29 can also be operated smoothly to thereby enable a reduction in the driving force of the actuator 42 and a downsizing of the actuator 42.

The intermediary portion 32c of the seal member 32 is provided with the rolling film 32cb. The intermediary portion 32c can thus be elastically formed in an excellent manner and the plunger 29 can be operated smoothly.

Additionally, the second engaging portion 32b is interposed between the front portion 291 and the rear portion 292 and so the engagement of the seal member 32 with the plunger 29 is ensured. The atmospheric valve V1 and the negative valve V2 are also arranged to be separated from each other in the forward and rearward direction, and the second engaging portion 32b is arranged between the atmospheric valve V1 and the negative pressure valve V2. Accordingly, the seal diameter of the seal member 32 can be approximated to the valve diameter of the atmospheric valve V1, the valve diameter of the negative pressure valve V2 and the effective diameter of the control valve 36.

The first engaging portion 32a and the second engaging portion 32b are arranged to be separated from each other in the forward and rearward direction and so the spring 48 can be installed relatively easily, particularly between the input member 28 and the plunger 29.

The seal diameter or the seal effective diameter of the seal member 32, the valve diameter of the atmospheric valve V1, the valve diameter of the negative pressure valve V2 and the effective diameter of the control valve 36 are approximated or substantially equal to each other and so the urging force of the spring 48 can be reduced. The drive force of the actuator 42 can also be reduced to allow the actuator 42 to be downsized with the starting load reduced.

In addition, before integrating the seal member 32 to the input member 28, the seal member 32, the plunger 29 and the spring 48 can be integrated, thereby promoting operational efficiency in an integrating step.

Although according to this embodiment, a tandem type construction of the negative pressure type servo unit 10 is shown and described, the invention is not particularly limited in this respect, and similar operations and effects can be achieved in a negative pressure type servo unit according to the invention where a single type construction is adopted.

Further, although in this embodiment the negative pressure type servo unit 10 is applied to an automatic braking apparatus for intervehicular distance control, the invention is not particularly limited in this regard and similar advantages can be achieved applying the negative pressure type servo unit according to the invention to negative pressure type servo unit requesting automatic operation.

Figure 5:
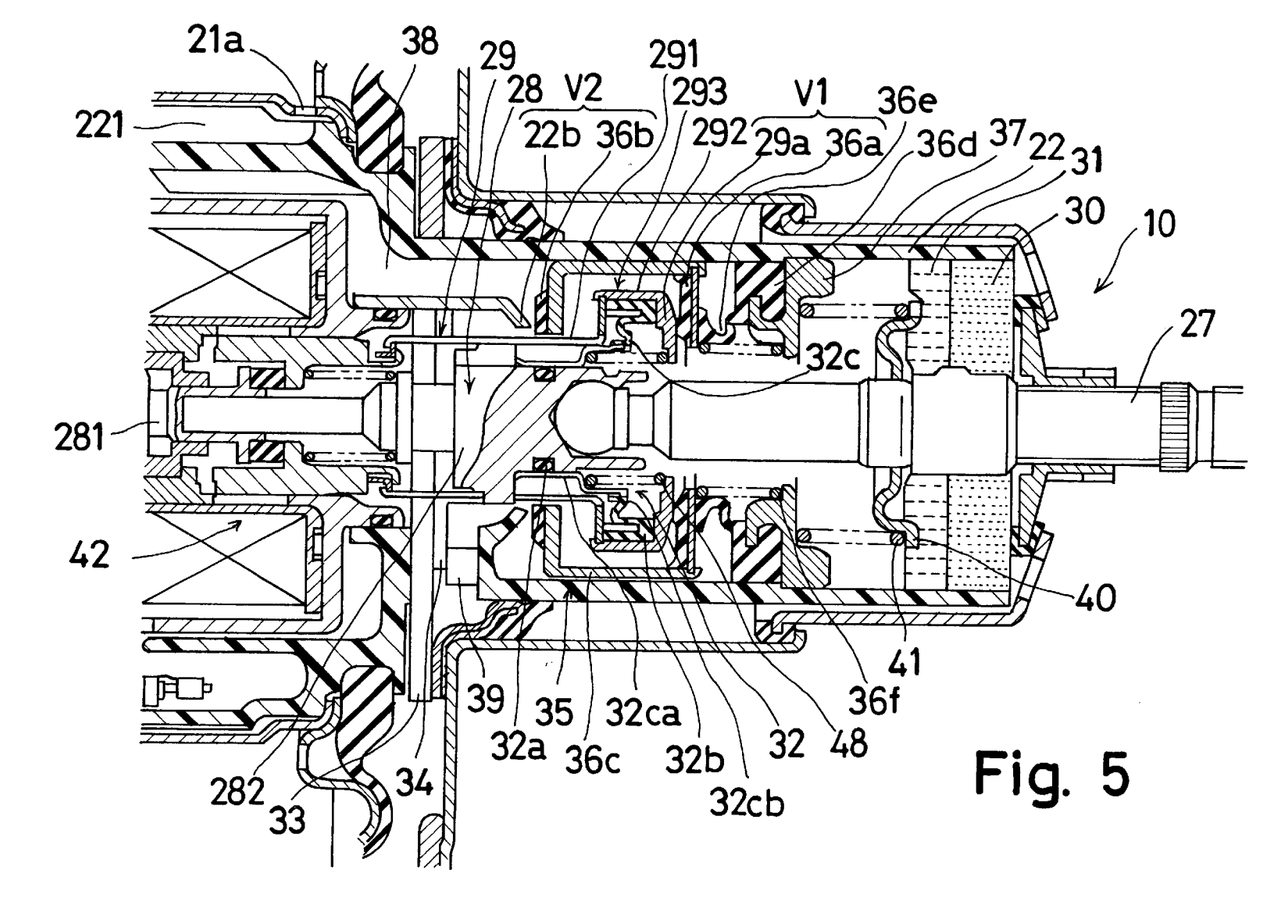
FIG. 5 is an enlarged cross-sectional view of the valve mechanism portion of a negative pressure type servo unit according to a second embodiment of the present invention.

FIG. 5 is an enlarged cross-sectional view of the valve mechanism 35 portion of the negative pressure type servo unit 10 according to a second embodiment of the invention. Features of the unit other than the valve mechanism 35 are substantially similar to those described above and so a detailed explanation will not be repeated again. Features in this embodiment that are similar to those in the above-described embodiment are identified by the same reference numerals.

As shown by FIG. 5, the seal member 32 includes the first engaging portion 32a engaged with the input member 28 and movable integrally with the input member 28, the second engaging portion 32b engaged with the plunger 29 and movable integrally with the plunger 29, and the intermediary portion 32c arranged between the first engaging portion 32a and the second engaging portion 32b for connecting the first engaging portion 32a and the second engaging portion 32b.

The first engaging portion 32a and the second engaging portion 32b are separated from each other in the forward and rearward direction (i.e., in left and right direction in FIG. 5) and the second engaging portion 32b is arranged on the rear side (i.e., the right side in FIG. 5) of the first engaging portion 32a. The first engaging portion 32a is formed by a rubber member, possesses an annular or ring-like shape, is fitted to the outer peripheral portion of the second input member 282 of the input member 28 and the second engaging portion 32b is constituted by a rubber member, is provided with an annular or ring-like member made of metal, and is sandwiched by the front portion 291 and the rear portion 292 at the dividing portion 293 of the plunger 29.

The intermediary portion 32c includes the stepped cylindrical member 32ca extending in the forward and rearward direction and constituting the first extending portion in contact with the outer peripheral portion of the first engaging portion 32a at its front end portion, and the rolling film 32cb constituting the second extending portion extending from the rear end portion of the cylindrical member 32ca toward the second engaging portion 32b.

The rolling film 32cb comprises a rubber member, is provided with the inner peripheral cylindrical portion, the outer peripheral cylindrical portion and the connecting portion for connecting the inner peripheral cylindrical portion and the front end portion of the outer peripheral cylindrical portion and defines a bent shape which is opened in the rearward direction. The rear end portion of the inner peripheral cylindrical portion of the rolling film 32cb is engaged with the rear end portion of the stepped cylindrical member 32ca, and the rolling film 32cb and the second engaging portion 32b are integrally formed to thereby integrally connect the rear end portion of the outer peripheral cylindrical portion and the inner peripheral portion of the second engaging portion 32b.

The spring 48 is arranged between the outwardly directed flange portion formed at the rear end portion of the rear portion 292 of the plunger 29 and the stepped difference portion of the cylindrical member 32ca of the intermediary portion 32c of the seal member 32. The spring 48 urges the plunger 29 in the rearward direction.

Before integrating the spring 48 and the seal member 32 to the input member 28, after the second engaging portion 32b of the seal member 32 is fixedly held by the plunger 29, when the spring 48 is arranged between the stepped difference portion of the cylindrical member 32ca of the intermediary portion 32c and the inwardly directed flange portion of the rear portion 292 of the plunger 29, by the urging force of the spring 48, the intermediary portion 32c of the seal member 32 is urged in the forward direction by the urging force of the spring 48, and the front face of the stepped difference portion of the cylindrical member 32ca of the intermediary portion 32c of the seal member 32 is brought into contact with the rear face of the stepped difference portion of the front portion 291 of the plunger 29. Thus, the plunger 29, the seal member 32 except the first engaging portion 32a, and the spring 48 are integrated.

After fitting the first engaging portion 32a to the input member 28, the plunger 29, the seal member 32 except the first engaging portion 32a, and the spring 48 which are integrated, are integrated to the input member 28. At this time, by slidably moving the cylindrical member 32ca of the seal member 32 on the outer peripheral portion of the first engaging portion 32a, integration of the input member 28 can be facilitated.

Other operations, effects and characteristics of this embodiment of the unit are similar to those discussed above.

Figure 6:
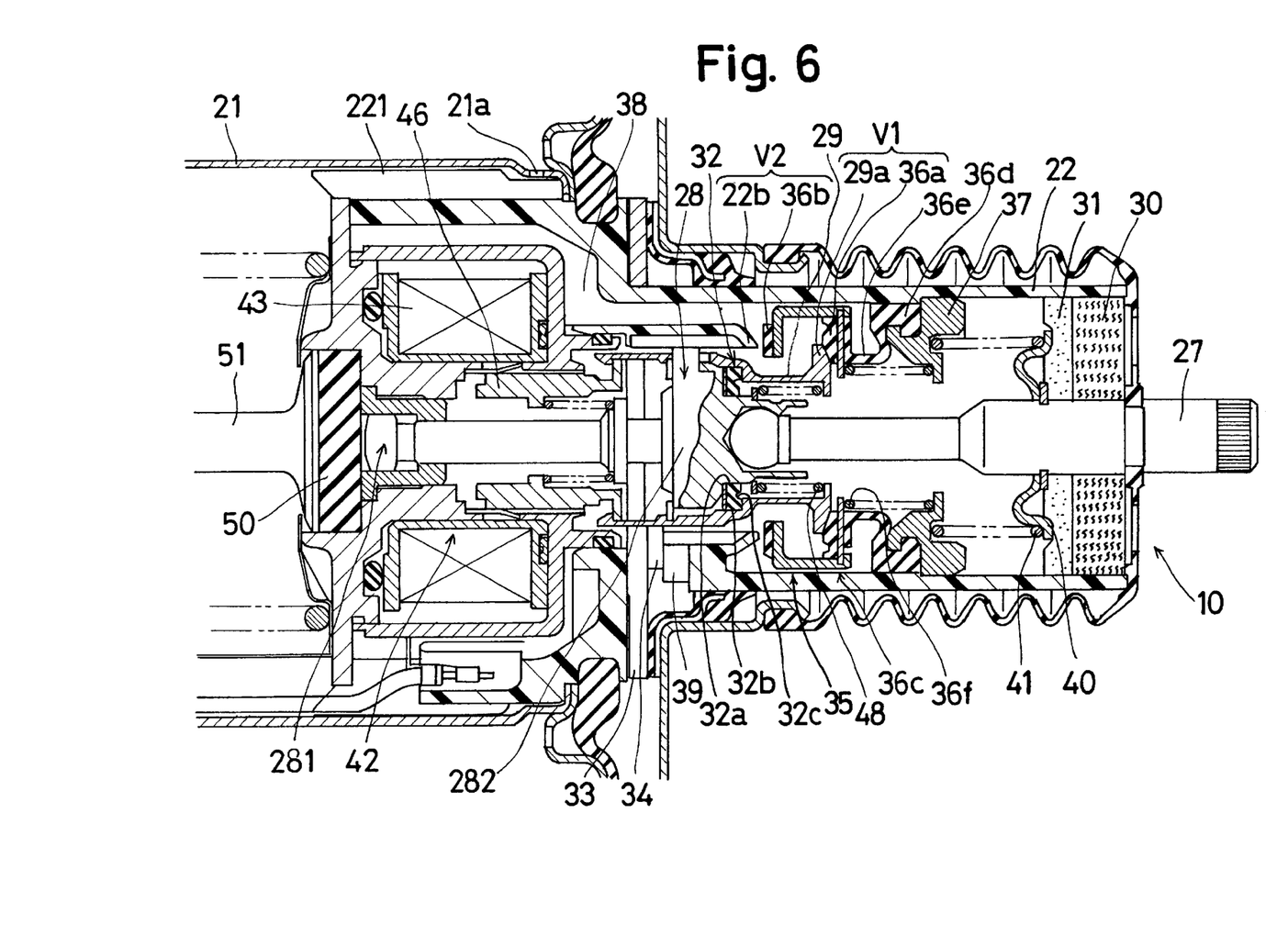
FIG. 6 is an enlarged cross-sectional view of the valve mechanism portion of a negative pressure type servo unit according to a third embodiment of the present invention.

FIG. 6 is an enlarged cross-sectional view of the valve mechanism 35 portion of the negative pressure type servo unit 10 according to a third embodiment of the invention. Features of the unit other than the valve mechanism 35 are substantially similar to those described above and so a detailed explanation will not be repeated again. Features in this embodiment that are similar to those in the above-described embodiments are identified by the same reference numerals.

As shown in FIG. 6, the seal member 32 is formed by a rubber member, possesses a substantially circular disk shape, and integrally includes the first engaging portion 32a engaged with the input member 28 and movable integrally with the input member 28, the second engaging portion 32b engaged with the stepped difference portion of the plunger 29 and movable integrally with the plunger 29, and the intermediary portion 32c arranged between the first engaging portion 32a and the second engaging portion 32b for connecting the first engaging portion 32a with the second engaging portion 32b.

The first engaging portion 32a is engaged with the rear face portion of the stepped difference portion of the second input member 282 of the input member 28, and the second engaging portion 32b is engaged with the stepped difference portion formed at the inner peripheral portion of the plunger 29. In the initial state shown in FIG. 6, negative pressure operates on the front side of the seal member 32 and atmospheric pressure operates on the rear side. However, there is no concern of detaching the seal member 32 from the input member 28 and the plunger 29 owing to frictional force produced between the inner peripheral portion of the first engaging portion 32a and the inner peripheral portion of the second input member 282 and the frictional force produced between the outer peripheral portion of the second engaging portion 32b and the inner peripheral portion of the plunger 29. In order to prevent the seal member 32 from detaching from the input member 28 and the plunger 29, for example, the first engaging portion 32a and the second engaging portion 32b may be fixedly adhered to the input member 32 and the plunger 29, respectively.

A ringlike slit is formed at the rear face of the intermediary portion 32c to thereby facilitate the elastic deformation of the seal member 32.

When the actuator 42 is operated and the movable core 46 and the plunger 29 are made to progress by the solenoid 43, the second engaging portion 32b is bent in the forward direction relative to the first engaging portion 32a with the intermediary portion 32c formed with the slit as a boundary portion. Therefore, the second engaging portion 32b of the seal member 32 progresses integrally with the plunger 29, and the plunger 29 can advantageously be smoothly moved.

Other operations, effects and characteristics of this embodiment of the unit are similar to those discussed above.

Figure 7:
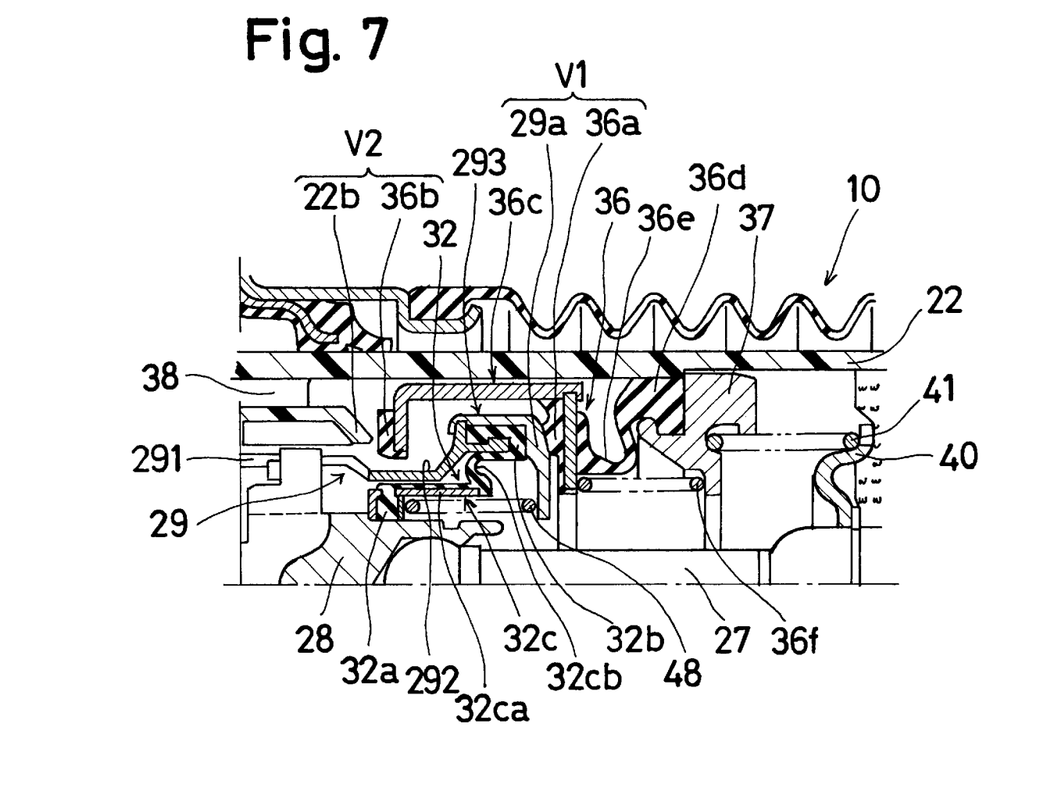
FIG. 7 is an enlarged cross-sectional view of the valve mechanism portion of a negative pressure type servo unit according to a fourth embodiment of the present invention.

FIG. 7 is an enlarged cross-sectional view of the valve mechanism 35 portion of the negative pressure type servo unit 10 according to a fourth embodiment of the invention. Features of the unit other than the valve mechanism 35 are substantially similar to those described above and so a detailed explanation will not be repeated again. Features in this embodiment that are similar to those in the above-described embodiments are identified by the same reference numerals.

As shown in FIG. 7, the seal member 32 includes the first engaging portion 32a engaged with the input member 28 and movable integrally with the input member 28, the second engaging portion 32b engaged with the plunger 29 and movable integrally with the plunger 29, and the intermediary portion 32c arranged between the first engaging portion 32a and the second engaging portion 32b for connecting the first engaging portion 32a with the second engaging portion 32b.

The first engaging portion 32a and the second engaging portion 32b are separated from each other in the forward and rearward direction (i.e., the left and right direction in FIG. 7) and the second engaging portion 32b is arranged on the rear side (i.e., the right side in FIG. 7) of the first engaging portion 32a. The first engaging portion 32a is formed by a rubber member, defines a ring-like shape, is fitted to the outer peripheral portion of the second input member 282 of the input member 28 and the second engaging portion 32b comprises a rubber member, is sandwiched by the front end portion 291 and the rear portion 292 at the dividing portion 293 of the plunger 29, and is engaged with the rear end portion of the front portion 291.

The intermediary portion 32c includes a cylindrical member 32ca extending in the forward and rearward direction and constituting the first extending portion engaged with the outer peripheral portion of the first engaging portion 32a at its front end portion, and the rolling film 32cb in which its front end portion is integrally connected to the first engaging portion 32a via the cylindrical member 32ca and constituting the second extending portion as well as the bent portion having a cylindrical portion baked to the outer peripheral portion of the cylindrical member 32ca and the rolling portion extended from the rear end portion of the cylindrical portion toward the second engaging portion 32b.

The rolling film 32cb comprises a rubber member. The rolling portion of the rolling film 32cb is provided with the inner peripheral cylindrical portion, the outer peripheral cylindrical portion and the connecting portion for connecting the inner peripheral cylindrical portion and the front end portion of the outer peripheral cylindrical portion, and defines a bent shape which is opened in the rearward direction. The rolling portion of the rolling film 32cb and the second engaging portion 32b are integrally formed to thereby integrally connect the rear end portion of the outer peripheral cylindrical portion of the rolling portion with the inner peripheral portion of the second engaging portion 32b.

Other operations, effects and characteristics of this embodiment of the unit are similar to those discussed above in connection with the other embodiments.

As has been explained, according to the present invention, by arranging the seal member having the first engaging portion integrally movable with the input member and the second engaging portion integrally movable with the plunger, the plunger can be operated smoothly. As a result, it is possible to reduce the drive force of the actuator and so the actuator can be downsized.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A negative pressure type servo unit comprising:
   a housing in which is formed at least one pressure space:
   a movable wall installed in the housing for progressing and regressing relative to the housing and dividing the pressure space into a front chamber communicated with a negative pressure source and a rear chamber selectively communicated with the front chamber and atmosphere;
   a power piston coupled to the movable wall;
   an input member arranged at an inner portion of the power piston and movable in a forward and rearward direction by operating a brake;
   a plunger arranged to the input member coaxially inside the power piston and movable in the forward and rearward direction, and movable in the forward and rearward direction by moving the input member;
   a seal member arranged between the plunger and the input member;
   a valve mechanism for communicating the rear chamber with the atmosphere and cutting off the rear chamber from the atmosphere, and communicating the negative pressure source with the rear chamber and cutting off the negative pressure chamber from the rear chamber by moving the plunger, the valve mechanism including an atmospheric valve for communicating the rear chamber with the atmosphere and cutting off the rear chamber from the atmosphere in accordance with the movement of the plunger and a negative pressure valve for communicating the negative pressure source with the rear chamber and cutting off the negative pressure source from the rear chamber in accordance with movement of the plunger, the atmospheric valve including an atmospheric valve seat arranged at the plunger and an atmospheric sealing portion adapted to contact and be spaced from the atmospheric valve seat, the negative pressure valve including a negative pressure valve seat arranged at the power piston and a negative pressure sealing portion adapted to contact and be spaced from the negative pressure valve seat, communication between the rear chamber and the atmosphere being cut off by bringing the atmospheric valve seat into contact with the atmospheric sealing portion and the rear chamber being communicated with the atmosphere by moving the atmospheric valve seat away from the atmospheric sealing portion, and communication between the rear chamber and the front chamber being cut off by bringing the negative pressure valve seat into contact with the negative pressure sealing portion and the rear chamber being communicated with the front chamber by detaching the negative pressure valve seat from the negative pressure sealing portion;
   an output member for outputting a progressive force of the power piston to outside the unit by being made to progress as a result of progress of the power piston in accordance with movement of the movable wall;
   an actuator adapted to move the plunger;
   the seal member comprising a first engaging portion engaged with the input member so that the engaging portion is movable integrally with the input member while the plunger and the input member have relative movement and a second engaging portion engaged with the plunger so that the second engaging portion is movable integrally with the plunger while the plunger and the input member have relative movement; and
   the atmospheric valve and the negative pressure valve being arranged to separate from each other in the forward and rearward direction and the atmospheric valve being arranged on a rear side of the negative pressure valve, and the second engaging portion being arranged between the atmospheric valve and the negative pressure valve in the forward and rearward direction.

2. The negative pressure type servo unit according to claim 1, including an urging member arranged between the input member and the plunger for urging the plunger rearwardly, the seal member and the plunger being engaged with each other by the urging member before the urging member integrates the first engaging portion to the input member.

3. The negative pressure type servo unit according to claim 1, wherein a seal diameter or a seal effective diameter of the seal member is approximately equal to a diameter of the atmospheric valve.

4. The negative pressure type servo unit according to claim 13, wherein the seal diameter or the seal effective diameter of the seal member is approximately equal to a diameter of the negative valve seat.

5. The negative pressure type servo unit according to claim 1, wherein a pressure difference is produced between a front side and a rear side of the seal member at least when the front chamber is communicated with the rear chamber.

6. The negative pressure type servo unit according to claim 1, wherein the atmospheric sealing portion and the negative pressure sealing portion form part of a control valve, the control valve also including an elongating and contracting portion, the seal member having an effective diameter approximately equal to a diameter of the atmospheric valve and an effective diameter of the elongating and contracting portion of the control valve.

7. A negative pressure type servo unit comprising:

a housing in which is formed at least one pressure space:

a movable wall installed in the housing for progressing and regressing relative to the housing and dividing the pressure space into a front chamber communicated with a negative pressure source and a rear chamber selectively communicated with the front chamber and atmosphere;

a power piston coupled to the movable wall;

an input member arranged at an inner portion of the power piston and movable in a forward and rearward direction by operating a brake;

a plunger arranged to the input member coaxially inside the power piston and movable in the forward and rearward direction, and movable in the forward and rearward direction by moving the input member;

a seal member arranged between the plunger and the input member;

a valve mechanism for communicating the rear chamber with the atmosphere and cutting off the rear chamber from the atmosphere, and communicating the negative pressure source with the rear chamber and cutting off the negative pressure chamber from the rear chamber by moving the plunger, the valve mechanism including an atmospheric valve for communicating the rear chamber with the atmosphere and cutting off the rear chamber from the atmosphere in accordance with movement of the plunger and a negative pressure valve for communicating the negative pressure source with the rear chamber and cutting off the negative pressure source from the rear chamber in accordance with movement of the plunger, the atmospheric valve including an atmospheric valve seat arranged at the plunger and an atmospheric sealing portion adapted to contact and be spaced from the atmospheric valve seat, the negative pressure valve including a negative pressure valve seat arranged at the power piston and a negative pressure sealing portion adapted to contact and be spaced from the negative pressure valve seat, communication between the rear chamber and the atmosphere being cut off by bringing the atmospheric valve seat into contact with the atmospheric sealing portion and the rear chamber being communicated with the atmosphere by moving the atmospheric valve seat away from the atmospheric sealing portion, and communication between the rear chamber and the front chamber being cut off by bringing the negative pressure valve seat into contact with the negative pressure sealing portion and the rear chamber being communicated with the front chamber by detaching the negative presuure valve seat from the negative pressure sealing portion;

an output member for outputting a progressive force of the power piston to outside the unit by being made to progress as a result of progress of the power piston in accordance with movement of the movable wall;

an actuator adapted to move the plunger;

the seal member comprising a first engaging portion engaged with the input member so that the engaging portion is movable integrally with the unput member while the plunger and the input member have relative movement and a second engaging portion engaged with the plunger so that the second engaging portion is movable integrally with the plunger while the plunger and the input member have relative movement; and the plunger being divided into a front portion and a rear portion arranged on a rear side of the front portion and arranged with the atmospheric valve seat, and the second engaging portion of the seal member being interposed between the front portion and the rear portion of the plunger.

8. The negative pressure type servo unit according to claim 7, wherein the atmospheric valve and the negative pressure valve are separated from each other in the forward and rearward direction and the atmospheric valve is arranged on a rear side of the negative pressure valve, and the second engaging portion is arranged between the atmospheric valve and the negative pressure valve in the forward and rearward direction.

9. The negative pressure type servo unit according to claim 8, wherein the first engaging portion and the second engaging portion of the seal member are separated from each other in the forward and rearward direction, and the second engaging portion is arranged on a rear side of the first engaging portion.

10. The negative pressure type servo unit according to claim 10, including an intermediary portion arranged between the first engaging portion and the second engaging portion, said intermediary portion being elastically deformable.

11. The negative pressure type servo unit according to claim 11, wherein the intermediary portion includes a bent portion opened rearwardly.

12. The negative pressure type servo unit according to claim 7, wherein the atmospheric sealing portion and the negative pressure sealing portion form part of a control valve, the control valve also including an elongating and contracting portion, the seal member having an effective diameter approximately equal to a diameter of the atmospheric valve and an effective diameter of the elongating and contracting portion of the control valve.

13. A negative pressure type servo unit comprising:

a housing in which is formed at least one pressure space:

a movable wall installed in the housing for progressing and regressing relative to the housing and dividing the pressure space into a front chamber communicated with a negative pressure source and a rear chamber selectively communicated with the front chamber and atmosphere;

a power piston coupled to the movable wall;

an input member arranged at an inner portion of the power piston and movable in a forward and rearward direction by operating a brake;

a plunger arranged to the input member coaxially inside the power piston and movable in the forward and rearward direction, and movable in the forward and rearward direction by moving the input member;

a seal member arranged between the plunger and the input member;

a valve mechanism for communicating the rear chamber with the atmosphere and cutting off the rear chamber from the atmosphere and communicating the negative pressure source with the rear chamber and cutting off the negative pressure chamber from the rear chamber by moving the plunger;

an output member for outputting a progressive force of the power piston to outside the unit by being made to progress as a result of progress of the power piston in accordance with the movement of the movable wall; and an actuator adapted to move the plunger;

the seal member comprising a first engaging portion engaged with the input member so that the engaging portion is movable integrally with the input member while the plunger and the input member have relative movement and a second engaging portion engaged with the plunger so that the second engaging portion is movable integrally with the plunger while the plunger and the input member have relative movement, the seal member also comprising an intermediary portion arranged between the first engaging portion and the second engaging portion and deformable elastically, the intermediary portion including a first extending portion extended rearward from the first engaging portion in the forward and rearward direction and a second extending portion extended from the first extending portion toward the second engaging portion.

14. The negative pressure type servo unit according to claim 13, wherein the second extending portion includes a bent portion bent rearwardly in the forward and rearward direction.

15. The negative pressure type servo unit according to claim 13, wherein the valve mechanism includes an atmospheric sealing portion and a negative pressure sealing portion forming part of a control valve, the control valve also including an elongating and contracting portion, the seal member having an effective diameter approximately equal to a diameter of the atmospheric valve and an effective diameter of the elongating and contracting portion of the control valve.

16. A negative pressure type servo unit comprising:

a housing in which is formed at least one pressure space:

a movable wall installed in the housing for progressing and regressing relative to the housing and dividing the pressure space into a front chamber communicated with a negative pressure source and a rear chamber selectively communicated with the front chamber and atmosphere;

a power piston coupled to the movable wall;

an input member arranged at an inner portion of the power piston and movable in a forward and rearward direction by operating a brake;

a plunger arranged at the input member inside the power piston and movable in the forward and rearward direction;

a seal member arranged between the plunger and the input member, said seal member including a portion engaging the plunger to move integrally with the plunger while the plunger and the input member have relative movement;

a valve mechanism for controlling relative pressures in the front and rear chambers;

an output member for outputting a progressive force of the power piston to outside the unit by being made to progress as a result of progress of the power piston in accordance with movement of the movable wall;

an actuator adapted to move the plunger; and the plunger being divided into a front portion and a rear portion, said rear portion being arranged on a rear side of the front portion, said portion of the seal member engaging the plunger being interposed between the front portion and the rear portion of the plunger.

17. The negative pressure type servo unit according to claim 16, wherein said seal member includes a portion engaging the input member to move integrally with the input member and being spaced apart from said portion engaging the plunger.

18. The negative pressure type servo unit according to claim 16, wherein valve mechanism includes an atmospheric sealing portion and a negative pressure sealing portion forming part of a control valve, the control valve also including an elongating and contracting portion, the seal member having an effective diameter approximately equal to a diameter of the atmospheric valve and an effective diameter of the elongating and contracting portion of the control valve.

19. A negative pressure type servo unit comprising:

a housing in which is formed at least one pressure space:

a movable wall installed in the housing for progressing and regressing relative to the housing and dividing the pressure space into a front chamber communicated with a negative pressure source and a chamber selectively communicated with the front chamber and atmosphere;

a power piston coupled to the movable wall;

an input member arranged at an inner portion of the power piston and movable in a forward and rearward direction by operating a brake;

a plunger arranged at the input member inside the power piston and movable in the forward and rearward direction;

a seal member arranged between the plunger and the input member, said seal member including a portion engaging the plunger to move integrally with the plunger while the plunger and the input member have relative movement, said seal member including a portion engaging the input member to move integrally with the input member and being spaced apart from said portion engaging the plunger, the seal member also including an intermediary portion arranged between the portion engaging the plunger and the portion engaging the input member;

a valve mechanism for controlling relative pressures in the front and rear chambers;

an output member for outputting a progressive force of the power piston to outside the unit by being made to progress as a result of progress of the power piston in accordance with movement of the movable wall; and an actuator adapted to move the plunger.

20. The negative pressure type servo unit according to claim 19, wherein valve mechanism includes an atmospheric sealing portion and a negative pressure sealing portion forming part of a control valve, the control valve also including an elongating and contracting portion, the seal member having an effective diameter approximately equal to a diameter of the atmospheric valve and an effective diameter of the elongating and contracting portion of the control valve.

* * * * *